US006561652B1

United States Patent
Kwok et al.

(10) Patent No.: US 6,561,652 B1
(45) Date of Patent: May 13, 2003

(54) OPTICAL ASSEMBLY FOR REFLECTIVE LIGHT VALVES

(75) Inventors: Hoi Sing Kwok, Tortola (VG); Xu Liu, Tortola (VG)

(73) Assignee: Vanntelligent (BVI) Limited (VG)

( * ) Notice: Subject to any disclaimer, the term of this patent is extended or adjusted under 35 U.S.C. 154(b) by 0 days.

(21) Appl. No.: 09/868,473

(22) PCT Filed: Dec. 22, 1999

(86) PCT No.: PCT/GB99/04369

§ 371 (c)(1),
(2), (4) Date: Oct. 3, 2001

(87) PCT Pub. No.: WO00/38432

PCT Pub. Date: Jun. 29, 2000

(30) Foreign Application Priority Data

Dec. 22, 1998 (GB) .............................................. 9828328
Apr. 16, 1999 (GB) .............................................. 9908777

(51) Int. Cl.[7] ........................ G03B 21/00; G03B 21/26; G03B 21/28; G03B 21/14; G02B 27/12

(52) U.S. Cl. ............................ 353/31; 353/33; 353/34; 353/37; 353/81; 353/20; 359/634; 359/639; 359/487; 349/9

(58) Field of Search ............................. 353/31, 33, 34, 353/37, 81, 20; 359/487, 292, 301, 639, 634; 349/9

(56) References Cited

U.S. PATENT DOCUMENTS

| 4,687,301 | A | | 8/1987 | Ledebuhr ..................... 350/401 |
| 4,969,730 | A | | 11/1990 | van den Brandt ........... 353/131 |
| 5,644,432 | A | | 7/1997 | Doany ......................... 359/634 |
| 5,829,854 | A | * | 11/1998 | Jones .......................... 353/33 |
| 6,052,231 | A | * | 4/2000 | Rosenbluth ................. 359/636 |
| 6,288,844 | B1 | * | 9/2001 | Edlinger et al. ............ 359/634 |
| 6,398,364 | B1 | * | 6/2002 | Bryars ......................... 353/31 |
| 6,404,552 | B1 | * | 6/2002 | Manabe ...................... 359/487 |
| 6,476,972 | B2 | * | 11/2002 | Edlinger et al. ............ 359/634 |

FOREIGN PATENT DOCUMENTS

WO  WO 98/14012  2/1998  ............ H04N/9/31

* cited by examiner

*Primary Examiner*—Russell Adams
*Assistant Examiner*—Melissa J Koval
(74) *Attorney, Agent, or Firm*—Blakely Sokoloff Taylor & Zafman

(57) ABSTRACT

An optical system for reflective mode light valve full color display, and more particularly a compact and highly optically efficient trichroic prism assembly (TPA), and a polarizing beam splitter (PBS). This TPA and PBS combination is placed between the objective lens and the LCD panel or other kind of reflective light valves to form a compact projection system.

15 Claims, 5 Drawing Sheets

OPTICAL ASSEMBLY FOR REFLECTIVE LIGHT VALVES

The invention relates to an optical system for reflective mode light valve full colour display, and more particularly to a compact and highly optically efficient trichroic prism assembly (TPA), and to a polarizing beam splitter (PBS). This TPA and PBS combination is placed between the objective lens and the LCD panel or other kind of reflective light valves to form a compact projection system.

BACKGROUND

Conventional projection displays employ mainly transmittive light valves, such as active matrix LCD panels. On the other hand, reflective made light valves offer many advantages such as high aperture ratio, high light efficiency and good projection image quality. Large scale projection systems based on reflective liquid crystal light valves (LCLV) have been successfully made and deployed. More recently, crystalline silicon based reflective mode CMOS liquid crystal light valves are available. They offer the additional advantages of full integration of CMOS circuits on the chip and economy of scale in mass production. Compact optical systems are needed for this new class of light valves.

In a reflective projector system, a collimated light source is first split into three primary colours by two dichroic colour filers (usually with a first blue filter and a second red filter). Then these light beams are directed onto the corresponding sight valves along different optical paths. The reflected light beams, having changed polarizations, are then recombined using two dichroic filters. These filters can be the same set of colour separating filters or different ones. The reflected light is separated from the incident light using a PBS and finally projected onto the screen. U.S. Pat. No. 4,687,301 disclosed one such colour separation-recombining optical assembly. Dichroic filters immersed in index matching fluid are used for both colour separation and recombination. The angle of incidence on the blue filter is 24° while it is 12° on the red filter.

U.S. Pat. No. 4,969,730 describes a 3-prism assembly which is commonly known as a colour splitting prism. This prism acts as both a colour separator and a colour recombiner. It is in principle the same as the invention disclosed in U.S. Pat. No. 4,687,301, but much improved in terms of ease of fabrication. The blue filter and red filter are coated onto the surfaces of prisms. The angles of incidence are all 30°. A PBS is also used to separate the incident beam from the polarization modulated reflected beam.

U.S. Pat. No. 5,644,432 describes a projection system where the colour separator and recombiner consist of the same 3-prism assembly. A PBS is used to separate the incident and reflected light beams. In this case, there is no air gap in the blue filter so that the 3 prisms can be glued together. The blue and red dichroic filters have large angles of incidence of 30° in order to maintain a short back working distance for the projective lens.

The optical system of a full colour reflective made LCLV projection, must have the following characteristics: (1) Large output light flux, which means large system optical invariance, or system etandue with LCLV, (2) Dual-polarization utilization, (3) High efficiency colour separation and recombination which is polarization independent, and (4) Compact and small retrofocus for the projection lens. The colour separation and recombination prisms disclosed in the prior art do not meet these requirements. It is accordingly an object of the invention to provide a colour splitting recombining prism with small incident angles for dichroic coatings.

Current liquid crystal (LCD) projection displays are based mainly on transmittive LCD light valves as the image generator. The drawback of this kind of LCD projector is that the aperture ratio (AR) of the LCD panel is small. It gets smaller as the resolution of the light valve increases. For example, the AR is about 0.67 for SVGA displays, and is about 0.5 for XGA LCD panels. In addition to low light efficiency, low AR also requires a black matrix to hide the transistors, which produces pixelation. Depixelization is therefore necessary, adding complexity to the optical system design. In this type of transmittive projector different sets of color filters are used for the separation of the input light into three primary colors and for recombining them after going through the LCD light valves. The color recombiner is usually performed with the X-cube.

Reflective mode silicon CMOS liquid crystal light valves can overcome the drawback of low AR in transmittive LCD panels. The AR of silicon based CMOS LCD can be as high as 92%, regardless of the resolution. It is because that the transistor can be hidden beneath the reflective mirror on the pixel. Thus the light efficiency and the quality of projected image can be greatly improved.

The projector optics of the reflective light valve is decidedly more complicated than transmittive ones. One consideration is the change of s and p polarization in the (AR) light path.

A full color projector can either be a time sequential type employing one reflective LCD panel or a 3-pastel type with all 3 primary colors on at the same time. This application is concerned with the latter. Such projectors generally require an optical sub-system to separate the primary colors from the input white light source (typically an arc lamp), and another sub-system to recombine the 3 primary colors after modulation by the reflective light valves. The color separator and the color recombiner can be the same item of optics or they can be physically different. For a compact projection system, the latter is much preferred.

There are several designs for the optical subassembly for reflective light valve based color projectors. The basic element for reflective light valve is a polarizing beam splitter (PBS), which reflects s-polarized light and transmit p-polarized light. In the must straightforward design, 3 PBS can be used for the 3 primary color panels. Color separation and color recombining can be done in separate sets of filters similar to the transmittive projectors. FIG. 1 shows the basic setup. Dichroic reflectors are used to reflect red and blue lights. The R, G, B channels are seat to the PBS and the 3 light valves. The image-modulated reflected lights are then sent to the color recombining X-prism for projection. Because the reflective coatings in the X-prism work best far s-polarized light, half wave plates are usually needed for the red and blue channels to rotate the p-polarized light from the reflective LCD. This system is thus quite complex

BRIEF SUMMARY OF THE INVENTION

According to a first aspect of the invention there is provided a polarizing beam splitter having s non-cubic configuration, the arrangement being such that angles of incidence on dichroic coatings or filters may be maintained of small value.

The splitter may be trapezoidal in configuration.

According to a second aspect of the invention there is provided apparatus for full colour projection display, including a prism assembly adapted to function as a colour separator and colour recombiner, and a plurality of reflective light valves.

The prism assembly may be trichroic.

The following calculations illustrate the invention, which can provide an optical sub-system where the angles of incidence of the light beams an the dichroic coatings are kept as small as possible. This is due to the phenomenon of polarization separation. A dielectric multilayer optical coating used to form the dichroic filter always consists of periodic stacks of high refractive index layer (H) and low reflective index layers (L). For $n_H d_H = n_L d_L = \lambda/4$, the reflected light is given by the expression:

$$\frac{\Delta \lambda_R}{\lambda} = \frac{4}{\pi} \sin^{-1} \left| \frac{\eta_H - \eta_L}{\eta_H + \eta_L} \right| \quad (1)$$

where $\Delta \lambda_R$ is the bandwidth of the reflected light $\eta_X$ and $\eta_L$ are the effective admittances of the H and L layers respectively. $\eta_H$ and $\eta_L$ are functions of the incident angle and the polarization state of the light. $\eta_{is} = n_i \cos \theta_i$ for s-polarization, and $$\eta_{ip} = \frac{\eta_i}{\cos \theta_i},$$

for p-polarization. Here i=H, or L and $\theta_i$ is the refractive angle in each film. The relation between $\theta_i$ and the incident angle $\theta$ is given by the usual relationship $n_p \sin \theta = n_i \sin \theta_i$.

A prism assembly and non-polarizing beam splitter embodying the invention are hereinafter described, by way of example, with reference to the accompanying drawings.

DETAILED DESCRIPTION

Figure 1A:
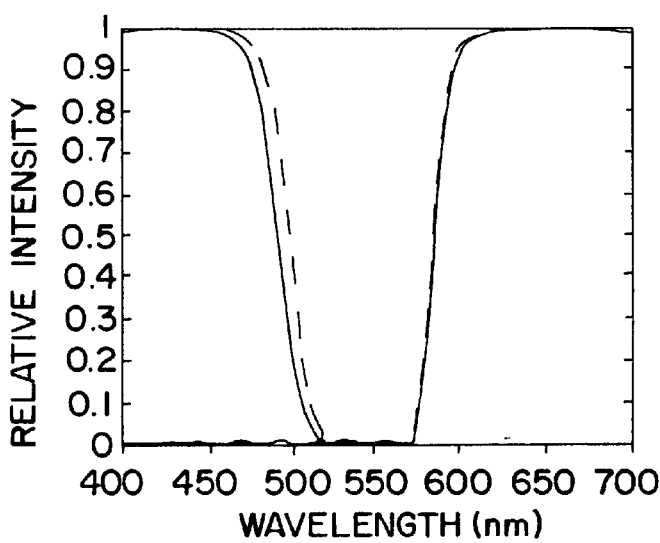
FIG. 1 shows graphically the sensitivity of dichroic coatings on polarization, the reflectance spectra varying as the incident angle is changed, as shown at (a), (b) and (c)
Figure 1B:
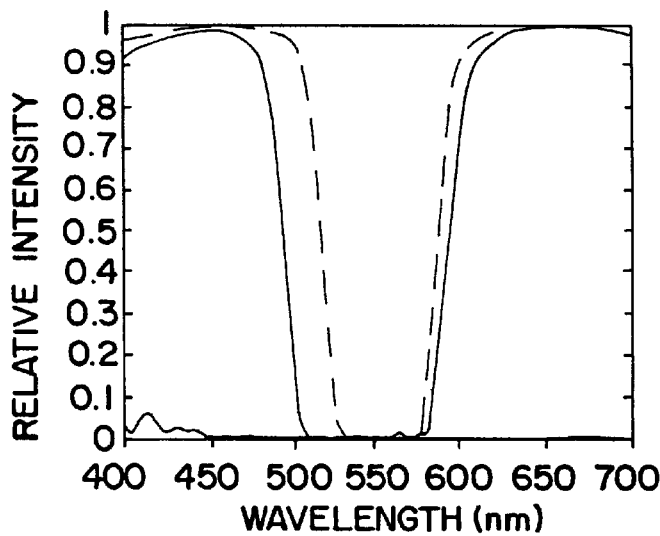
Figure 1C:
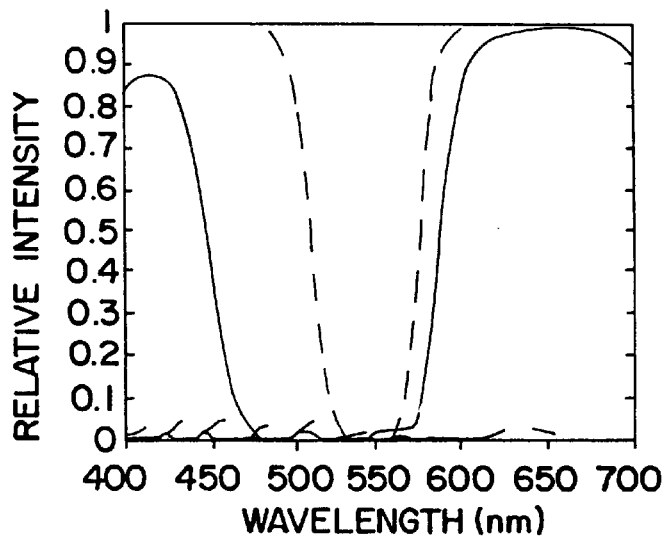

The effective admittance η of the thin film changes as the incident angle θ changes. The difference between the reflectance spectra of the s-, p-polarized light becomes larger and larger as the incident angle increases. Therefore large incident angle will induce large separation between the spectra reflection band of s-polarized light and p-polarized light. FIG. 1 shows the spectral reflectance of a red edge filter and a blue edge filter plotted together. These coatings are used for a trichroic prism assembly in separating the 3 primary colours of red, green and blue. In the calculation, angles of incidence of 16° (a), 30° (b) and 45° (c) (FIG. 1) are used respectively. The solid curves pertain to p-polarized light while the dashed curves are for s-polarized light. The coating is assumed to be between air and glass ($n_g = 1.5163$).

FIG. 1 clearly shows that as the angle of incidence increases, the reflective spectra for the s- and p-polarized lights become more and more dissimilar. This is highly undesirable since the reflective light valve works on polarization modulation. A change in reflectance upon polarization change implies a loss of reflected signal onto the projected screen and a shift in the colour coordinate and loss of colour fidelity. The 45° curves (c) correspond to the case of the X-cube colour separator or recombiner. It is clear that the X-cube cannot be used as a colour separator and colour recombiner at the same time. On the other hand, an incidence angle of 16° (a) is acceptable, as seen from FIG. 1. This is the incident angle achieved in the invention.

Figure 2:
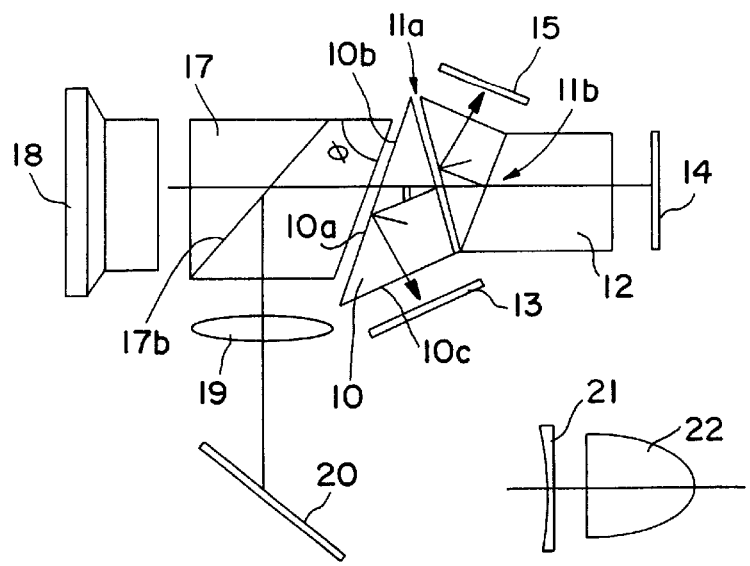
FIG. 2 is the schematics of a typical projection system.

FIG. 2 shows a projection system similar to the projection system embodying the present invention. This is a projection system employing reflective light valves. Three light valves 13, 14, 15 are used for the three primary colours of red, green and blue respectively. The light source 22 is first collimated by the reflector of the light source itself, and the lens combination 19 and 21. A cold mirror 20 is used to filter out the unwanted infrared radiation which otherwise will produce excessive heating in the light valves. The light beam then enters a non-cubic, in the embodiment, trapezoidal shaped, PBS 17. The coating on the inside surface 17b of this PBS is such that p-polarized light is transmitted and s-polarized light is reflected. The p-polarized reflected light then enters the trichroic prism assembly 10,11,12.

Figure 3:
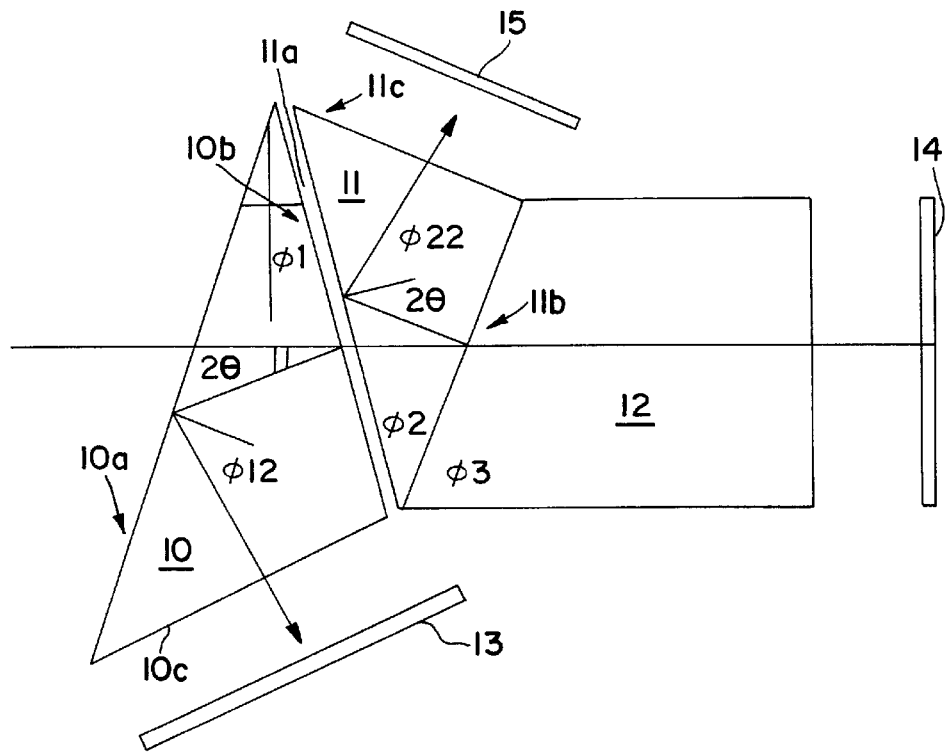
FIG. 3 shows details of the colour splitting/recombining assembly.

FIG. 3 shows the details of the trichroic prism assembly which contains three prisms. Prism 10, (AR) instead of having an entrance surface 10a perpendicular to the optical axis, which generally the case previously is at an angle of 90° -ϕ$_{10}$ to the optical axis. This allows the angle of incidence onto surface 10b to be small.

The first dichroic coating is carted on surface 10b of prism 10. This coating is designed to reflect one primary colour. In one embodiment, blue colour is reflected. In another embodiment, red colour can be reflected. It is important that the reflected colour be impinging on surface 10a at an angle which is larger than the critical angle for total internal reflection of light inside the prism. The totally internally reflected light will then exit surface 10c more or less perpendicularly to be incident on the reflective light valve 13. The reflected light from the light valve 13 is modulated in polarization. This reflected light goes through the same path and impinges on surface coating 17b of the PBS. It will either be reflected back to the light source or transmitted and be projected onto the screen depending on the action of light valve 13. Thus the light valve will induce an image on the screen through polarization modulation.

At surface 10b, the transmitted light enters prism 11 and impinges upon surface 11b. This surface is coated with a dichroic filter such that one colour component, usually the red colour, is reflected and directed towards the air gap 11a. The angle of incidence of the light on the air gap is such that total internal reflection occurs. The totally internally reflected light is sent to light valve 15. The outlet surface 11c is nearly perpendicular to the light beam. The reflective light valve will modulate the polarization of the light beam. Upon reflection and retracing the original beam path this modulated light will impinge on surface 17b of the PBS. Again, this light beam will either be reflected or transmitted for projection depending on the action of the light valve.

The last colour component of the light, usually the green colour, will be transmitted through prism 12, and directed towards light valve 14. The reflective light from the light valve 14 will trace back the main optical axis. Similar to the other components, this reflected light will form an image on the screen depending on the polarization modulation by light valve 14.

All the air/glass 10a, 10c, 11a, 11c and the outlet surfaces of prism 12 are coated with AR coatings. The AR coatings on surfaces 11a and 10a are special broadband AR coatings. It must take into account the phase change induced-by the dichroic coatings and total internal reflection. There are also air gaps between prism 10 and prism 11, and between prism 10 and the PBS 17. These air gaps are needed for total internal reflection. Alternatively, in another embodiment, special coatings may be used for reflection of the various colour components without the air gap.

The angles of the three prisms are important. They are such that the angles of incidence are minimized, and total internal reflection can be achieved. Thus let the incident angles of the two dichroic coatings (in 10b and 11b) be the same and noted as θ. It can be shown easily that:

$$\theta > \frac{1}{3}\left(\sin^{-1}\left(\frac{1}{n}\right) + NA\right) \quad (2)$$

where n is the refractive index of the prism and NA is the numerical aperture of the projection system. Therefore, if the refractive index of the prism is 1.52, and the F number of the system is 3.5, then from equation (2), one can have a θ of 16°. This is the smallest angle possible. If one allows the dichroic filters to have different angles of incidence, then other values can be obtained.

The other angles of the prism assembly from these equations are: $\phi_2=32°$, $\phi_3=74°$. Also $\phi_1$ should satisfy $$\phi_1 + \theta > \sin^{-1}\left(\frac{1}{n}\right) + NA \quad (3)$$

for total internal reflection in prism 10. If one takes $\phi_1$ to be 32°, then prism 10 and prism 11 will be identical in angles. This should make manufacturing of such prism assemblies easier.

The size of the prisms will be determined by the size of the reflective light valves and the path lengths of three colour light beams inside the prism assembly. It must be mentioned that the angle of incidence also depends on the refractive index of the prism. If a higher refractive index prism is used the angle of incidence of the dichroic coatings can be decreased even more.

In this embodiment the two dichroic coatings have the same angle of incidence. This is useful for mass production purposes. However, it is not a necessary condition. It is clear that, from FIG. 2, the polarization effects on the reflectance spectrum is quite small. Moreover, the small angle of incidence will also decrease the dependence of the reflectance on variations in incidence angle (the acceptance angle). A larger acceptance angle of the dichroic coating implies that this prism structure can also improve the numerical aperture of the entire optical system.

Figure 4:
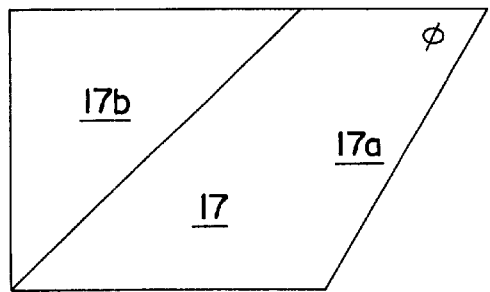
FIG. 4 shows the non-cubic polarizing beam splitter.

FIG. 4 shows a non-cubic shaped polarizing beam splitter. This PBS 17 consists of a right angle prism which is the same as other conventional PBS, and another part with a special angle of $\phi=73°$. This is needed to match the surface 10a of prism 10. Both surfaces 10a and 17a are coated with AR coatings. Surface 17b is coated with broadband AR coating. In the preferred embodiment, the materiel of PBS 17 should be BK7 glass, so that this PBS will have low tension, high transparency at short wavelengths, and high polarization efficiency.

Figure 5:
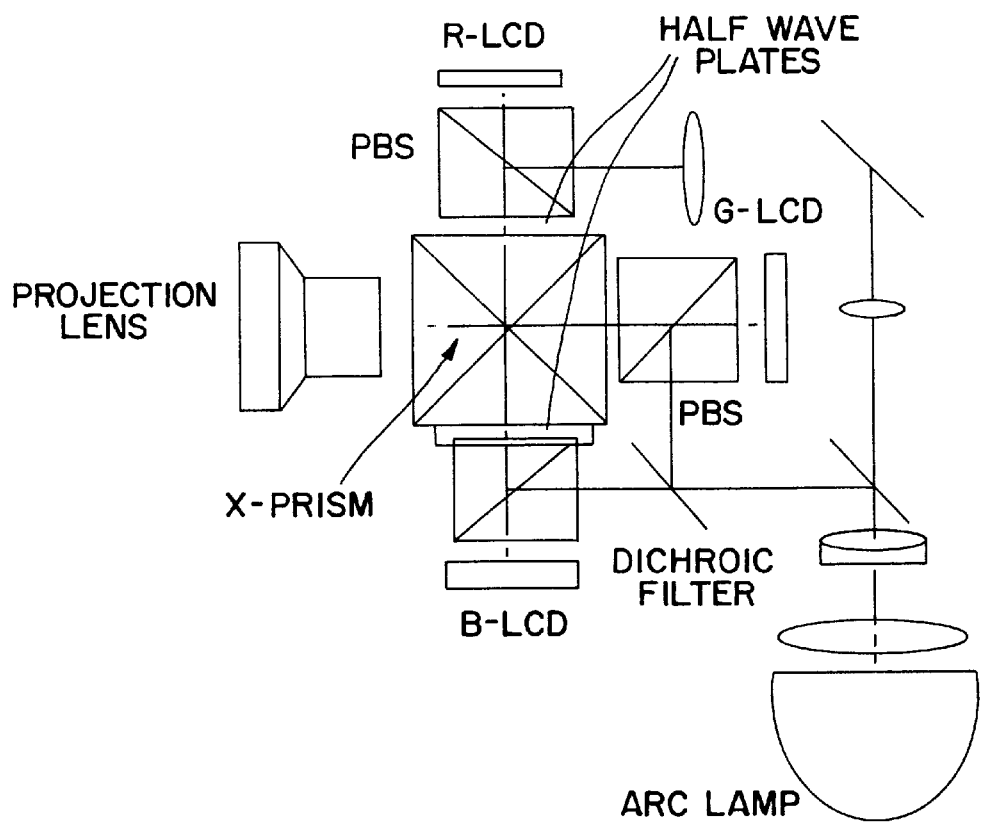
FIG. 5 Optical system far a reflective color projector using conventional configuration.+999+.

Thus using the invention described herein, with reference to the accompanying drawings, there is provided an optical sub-system for full colour projection displays, such as shown in FIG. 5, which employs reflective light valves. This sub-system consists of a non-cubic polarizing beam splitter, and a trichroic prism assembly, which can act as both a colour separator and a colour recombiner for the 3 primary colours. The trichroic prism assembly contains two dichroic edge filter coatings that separate three primary colours, said red, green and blue colours, of the incident light into three correspondent channels, respectively. These two dichroic coatings are kept inside the prism assembly and are optimized for small incident angles and low polarization dependence.

The same trichroic prism assembly is used for colour recombining. The 3 colour channels are modulated in polarizations by the reflective light valves. The light beams essentially retrace the original light path and go through the same dichroic filters, albeit with different polarizations. The dichroic filters are polarization insensitive.

In order to keep the incident angles on the dichroic filters of the trichroic prism assembly to be small, a non-cubic polarizing beam splitter (PBS) is provided. By allowing the PBS to have a trapezoidal shape, the angles of incidence on the dichroic filters can be maintained to be small.

Figure 6:
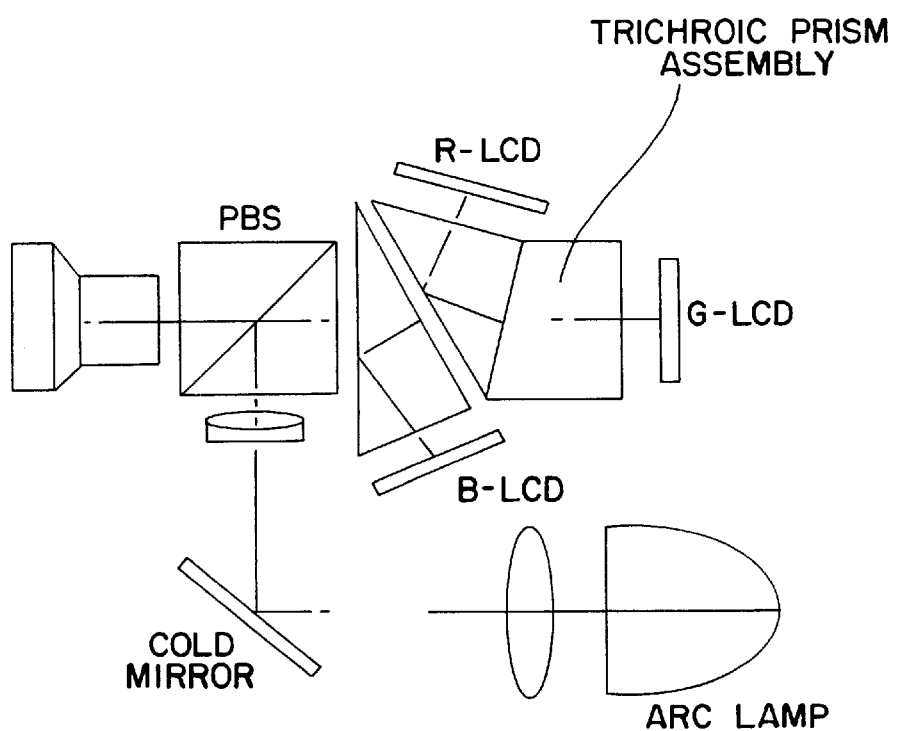
FIG. 6 Optical system for a reflective color projection display employing a trichroic prism assembly.

Alternatively, for compact color projectors employing reflective light valves the color separation and the color recombination should be performed with the same set of optical coatings. A common optical assembly to accomplish this task is the so-called Philips prism. This trichroic prism assembly (TPA) works in conjunction with only one PBS to form the core of a compact color reflective projector. This system is shown in FIG. 6

The PBS first sent either the p or s polarized light into the TPA. The choice of s or p polarization depends on the position of the arc lamp and the projector lens. The first two prisms in the TPA are 30° prisms. The coatings on their exit surfaces are used to separate out the blue and red colors. Air gaps are provided as shown so that total internal reflection can occur to reflect the red and blue beams out of the way.

The three color channels leave the TPA and impinge on the reflective LCD light valves. The action of the nematic liquid crystal is to control the polarization state of the reflected light. Many optical modes have been proposed for the LCD panels. In all cases, the reflected light is rotated in polarization by 90°, if the pixel is selected. This light beam retraces the same light path as the incident beam and goes through the PBS.

Hence the high reflectance coating for both the blue and red lights have to function for both s and p polarized light. This is a difficult requirement for coating design. It is well-known that it is impossible for a dichroic coating to have no polarization dependence unless the angle of incidence is zero. Because of the requirement of total internal reflection for the red and blue beams, the angle of incidence on the blue and red color filter surfaces is limited to at least 30°. Thus the conventional TPA has severe polarization dependence its reflectance spectrum. This so-called s-p polarization split causes severe loss of light efficiency and loss of color fidelity in the display.

Figure 7:
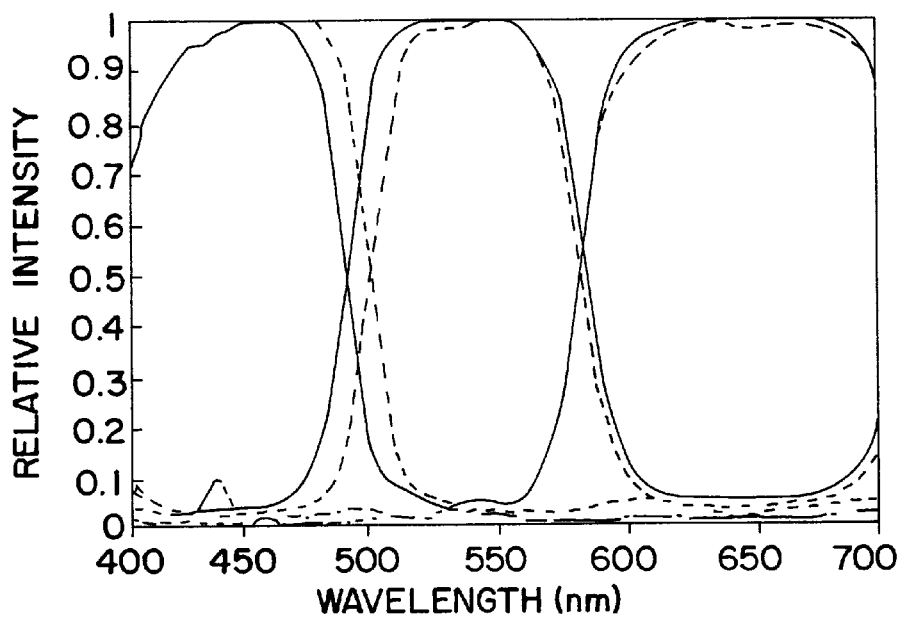
FIG. 7 Calculated reflectance spectra for the red and blue edge reflection coatings for incidence angles of (a) 16°, (b) 30°, (c) 45°. Solid curves: p-polarized light. Dotted curves: s-polarized light.

FIG. 7 shows the calculated reflectance spectra for the red and blue coatings for three different incidence angles of 16°, 30° and 45°. The red and blue edge filter spectra are plotted in the same figures, representing 3-color-separations. The solid curves are for the p-polarized while the dashed curves are for 5-polarized light. The coatings are assumed to be wedged between glass with are index $n_s$ of 1.5163. It can be seen clearly that, as the angle of incidence increases the separation of the spectra between s- and p-polarizations increases greatly.

This so-called s-p polarization split will cause a loss in reflected light intensity. There will also be a shift in the color co-ordinate of the separated and recombined light.

It is an object of the invention to seek to mitigate this disadvantage.

The s-p polarization split for optical coatings comes from the fact that the specific admittance of light is different for s- and p-polarized light. The admittances are functions of the incident angle and the polarization state of the light. They are given by $$\eta_{is} = \eta_i \cos\theta \text{ for s-polarization} \tag{1}$$

and $$\eta_{ip} = \frac{\eta_i}{\cos\theta} \text{ for p-polarization} \tag{2}$$

In eqs. (1) and (2), the subscript i stands for the ith layer in the coating stack.

The effective admittance $\eta$ of the thin film changes as the incident angle of light is changed. And the difference between the s and p polarization spectrum becomes much larger as the incident angle increases. Therefore large incident angle will induce a large separation between the reflectance spectra of s-polarized and p-polarized light. This is evidenced is the calculated spectra is FIG. 7.

The crux to the problem of optimizing the trichroic color separation/recombination prism is in reducing the angle of incidence of the light on the dichroic coatings. This incidence angle is limited by the requirement of total internal reflection for the blue and red channels. Thus there is provided a trichroic color separation/recombination prism assembly where the angle of incidence on the dichroic coatings has been reduced to 16°.

Figure 8:
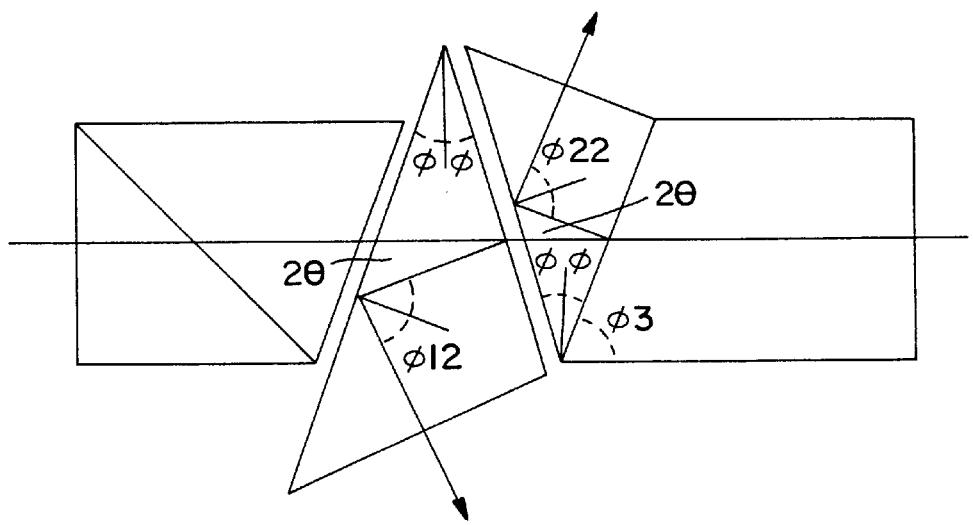
FIG. 8 The new trichroic prism assembly together with the new non-cubic PBS.

The design of this prism is shown in FIG. 8. The main idea is that we can allow the PBS to have non-orthogonal, rather than the conventional cubic shape. This will relax the design conditions and allow a smaller angle of incidence.

A blue high reflectance coating is applied on surface BC, and a red high reflectance coating is applied on surface CD. The incident angles of the two dichroic coatings are the same and denoted as θ. Now the condition of total internal reflection on the two inside surfaces (AB and BC) must be maintained. Moreover, it is assumed that surfaces AB and CD are parallel. The relation between the various angles of the TPA must satisfies following conditions:

$$\theta = \phi \tag{3}$$

$$\phi_{12} \geq \sin^{-1}\left(\frac{1}{n}\right) + \sin^{-1} NA \tag{4}$$

$$\phi_{22} \geq \sin^{-1}\left(\frac{1}{n}\right) + \sin^{-1} NA \tag{5}$$

and $$\phi_3 = 90° - \theta \tag{6}$$

Therefore $$\theta > \frac{1}{3}\left(\sin^{-1}\left(\frac{1}{n}\right) + \sin^{-1} NA\right) \tag{7}$$

In these equations, n is the refractive index of the prism material and NA is the numerical aperture of the projection system. Therefore, if the refractive index of the prism is 1.52, and the F-number of the optics is 4, then from eq. (7), the smallest angle of incidence θ allowed is 16°. Additionally, is can be seen that θ=16° and $\theta_3$=74°. The size of the prisms of course depends on the size of the LCD light valves.

Thus there is provided a very simple prism assembly where the two dichroic coatings have the same angles of incidence. Prisms ABC cad BCD are similar, thus making mass production easier. It is clear from FIG. 7 that this TPA has a small and acceptable polarization effect. Moreover, the small angle of incidence implies a small dispersion effect on the incidence angle. Therefore the dichroic coating can have large acceptance angles or a large etandue. All in all, this new prism structure can improve the numerical aperture of the entire optical system greatly, while maintaining excellent color separation properties.

Both a conventional TPA and a new TPA were constructed for comparison. The dichroic coatings applied have been optimized for red and blue light separation. The data was taken using a PR650 spectrometer. The reflectance far the various polarizations and color coatings has been normalized for comparison. Three peaks for the conventional TPA correspond to the output form the red, green and blue channels of the TPA.

There was a shift is the spectra for s and p-polarizations. The p-polarized reflectance is shifted to the blue by as much as 10 nm.

In the case of the measured reflectance spectra for the new TPA, with an angle of incidence of 16°, it was found that there is negligible s-p polarization split. This result is in good agreement with the numerical results is FIG. 7. The spectra for both the s-polarized and p-polarized light are very sharp and identical. This TPA should be useful for a compact color projector as shown in FIG. 6.

In summary, we have shown that the major limitation for the design of a compact color projector using reflective LCD light valves is in the design of the color separator and recombiner. By modifying the design of the conventional TPA, we were able to achieve a marked improvement in the s-p polarization split problem.

Thus using the invention, color separation and recombination can be achieved in a single set of optical elements with high fidelity. The angle of incidence on the dichroic coatings is preferably about 16°.

The prism hereinbefore described has the advantages of low s and p polarization dependence on the reflectance spectrum. Hence it can be used for both color separation and velar recombining with polarization change. The trichroic prism assembly can be used in a compact color projector employing reflective liquid crystal light valves.

The optical etandue and spectral/polarization effects are the two major properties of the optical projection system that need to be optimized. This is true for both reflective mode or transmittive mode projectors. For reflective projectors, the optical coatings are the major limits to the system etandue. The polarization splitting effect on the trichroic prism assembly is a significant cause of degradation of the optical system performance. The optical system proposed here provides a significant improvement over existing designs. The new TPA should find major applications in compact projectors such as desktop monitors and flat panel televisions.

We claim:

1. A projection system for full colour image display, comprising:

a light source for emitting a white light beam and an illumination optical system to direct and collimate the white light beam;

a polarizing beam splitter having a non-cubic shape to reflect a particular polarization of the input light;

a trichroic prism assembly for separating the three primary colours from the white light beam and for directing the separated light to three valves respectively, the reflective polarization modulating light each light valve producing the corresponding colour image signal;

said trichroic prism assembly being used to recombine the reflected light beams;

said polarizing beam splitter being used to direct the light beam either back to the light source or to the screen depending on a polarization change imparted by the reflective light valves;

a projective lens system to image the light onto a screen and to form a full colour image, wherein said polarizing beam splitter comprises a right angle prism and a trapezoidal prism having a polarizing coating between them, an acute angle of the trapezoidal prism is 74±5°, which is selected to match a surface of said right angle prism and in that the trichroic prism assembly comprises three prisms, two of them triangle prisms, and the third one being a trapezoidal prism having dichroic coatings coated on the surface between the prisms.

2. A system according to claim 1, wherein the angles of the triangular prisms are 32±5°, 48±5°, and 100±5° respectively.

3. A system according to claim 1, wherein the two dichroic coatings comprising the same angle of incidence.

4. A system according to claim 3, wherein the angle of incidence is 16±5°.

5. A system according to claim 3, wherein the dichroic coating on one surface of the trichroic prism assembly is an edge filter having high reflectance for blue colour and a transmitter for the rest.

6. A system according to claim 3, wherein the dichroic coating on one surface of the trichroic prism assembly is an edge filter having a high reflectance for red colour and transmitter for the rest.

7. A system according to claim 5, wherein the reflectance spectra of the dichroic coatings has a spectral shift between the s- and p-polarizations of less than 5 nm.

8. A system according to claim 1, wherein the reflective light valves comprise liquid crystal light valves.

9. A system according to claim 8, wherein the liquid crystal light valves are silicon backplane active matrix driven liquid crystal cells.

10. A system according to claim 1, wherein the transmitted light of the polarizing beam splitter reflects s-polarized light.

11. A system according to claim 1, wherein the transmitted light of the polarizing beam reflects p-polarized light.

12. A system according to claim 1, wherein the light source enters the polarizing beam splitter along the principle axis of the trichroic prism assembly.

13. A system according to claim 1, wherein the light source enters the polarizing beam splitter perpendicularly to the principle axis of the trichroic prism assembly.

14. A system according to claim 1, wherein the trichroic prism assembly has an air gap between the triangular prisms.

15. A system according to claim 1, wherein the polarizing beam splitter and trichroic prism have an air gap between the said polarizing beam splitter and the trichroic prism assembly.

* * * * *

UNITED STATES PATENT AND TRADEMARK OFFICE
CERTIFICATE OF CORRECTION

PATENT NO. : 6,561,652 B1
DATED : May 13, 2003
INVENTOR(S) : Kwok et al.

It is certified that error appears in the above-identified patent and that said Letters Patent is hereby corrected as shown below:

<u>Title page,</u>
Item [57], ABSTRACT,
Line 1, please delete "color" and insert -- colour --.

Signed and Sealed this

Second Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,561,652 B1 Page 1 of 1
DATED : May 13, 2003
INVENTOR(S) : Kwok et al.

It is certified that error appears in the above-identified patent and that said Letters Patent is hereby corrected as shown below:

Title page,
Item [73], Assignee, should read -- Varintelligent (BVI) Limited --
Item [57], ABSTRACT,
Line 1, please delete "color" and insert -- colour --.

This certificate supersedes Certificate of Correction issued November 2, 2004.

Signed and Sealed this

First Day of February, 2005

JON W. DUDAS
*Director of the United States Patent and Trademark Office*